(12) United States Patent
Wu

(10) Patent No.: US 12,030,211 B2
(45) Date of Patent: Jul. 9, 2024

(54) METHOD FOR 3D PRINTING PREFABRICATED MODULAR BUILDINGS

(71) Applicant: BEIJING HUASHANG LUHAI TECHNOLOGY CO., LTD., Beijing (CN)

(72) Inventor: Jianping Wu, Beijing (CN)

(73) Assignee: BEIJING HUASHANG LUHAI TECHNOLOGY CO., LTD., Beijing (CN)

( * ) Notice: Subject to any disclaimer, the term of this patent is extended or adjusted under 35 U.S.C. 154(b) by 381 days.

(21) Appl. No.: 17/417,751

(22) PCT Filed: Jul. 30, 2019

(86) PCT No.: PCT/CN2019/098325
§ 371 (c)(1),
(2) Date: Jun. 23, 2021

(87) PCT Pub. No.: WO2020/206877
PCT Pub. Date: Oct. 15, 2020

(65) Prior Publication Data
US 2022/0072733 A1    Mar. 10, 2022

(30) Foreign Application Priority Data

Apr. 9, 2019   (CN) .......................... 201910281602.1

(51) Int. Cl.
*B28B 1/00* (2006.01)
*B33Y 10/00* (2015.01)
(Continued)

(52) U.S. Cl.
CPC .............. *B28B 1/001* (2013.01); *B33Y 10/00* (2014.12); *E04B 1/16* (2013.01); *B28B 7/22* (2013.01);
(Continued)

(58) Field of Classification Search
CPC ........... B28B 1/001; B28B 7/22; B28B 23/02; B33Y 10/00; B33Y 30/00; B33Y 70/10;
(Continued)

(56) References Cited

U.S. PATENT DOCUMENTS

| 3,640,658 | A | * | 2/1972 | Price | .................... | E04G 21/168 |
| | | | | | | 425/436 R |
| 2002/0104287 | A1 | * | 8/2002 | Sanger | ................ | E04B 1/34823 |
| | | | | | | 52/125.4 |
| 2011/0099919 | A1 | * | 5/2011 | Ojanen | .................. | E03F 11/00 |
| | | | | | | 264/35 |

FOREIGN PATENT DOCUMENTS

CN    107246150 A  * 10/2017
CN    208586502 U  *  3/2019
(Continued)

OTHER PUBLICATIONS

Zuo et al., CN 208586502 U, published Mar. 8, 2019, machine translated to English (Year: 2019).*
(Continued)

*Primary Examiner* — Nahida Sultana
*Assistant Examiner* — Lawrence D. Hohenbrink, Jr.

(57) ABSTRACT

A method for 3D printing a prefabricated modular building includes rotating an intermediate module (300) by 90 degrees to obtain a fabricated module (400), so that two originally vertical walls (A, C) become horizontal walls, and the other two walls (B, D) become supporting walls. This enables the building to be able to receive stresses as a whole, improving the stability of the building.

7 Claims, 10 Drawing Sheets

(51) Int. Cl.
*E04B 1/16* (2006.01)
*B28B 7/22* (2006.01)
*B28B 23/02* (2006.01)
*B33Y 30/00* (2015.01)
*B33Y 70/10* (2020.01)
*E04B 1/348* (2006.01)
*E04G 11/02* (2006.01)
*E04G 11/36* (2006.01)
*E04G 21/00* (2006.01)

(52) U.S. Cl.
CPC ............... *B28B 23/02* (2013.01); *B33Y 30/00* (2014.12); *B33Y 70/10* (2020.01); *E04B 1/34823* (2013.01); *E04G 11/02* (2013.01); *E04G 11/36* (2013.01); *E04G 21/00* (2013.01)

(58) Field of Classification Search
CPC ....... E04B 1/16; E04B 1/34823; E04G 21/00; E04G 11/02; E04G 11/36
USPC .......................................................... 264/34
See application file for complete search history.

(56) References Cited

FOREIGN PATENT DOCUMENTS

CN 208586502 U 3/2019
EP 1609921 A2 * 12/2005 ......... E04B 1/34807

OTHER PUBLICATIONS

Ni et al., CN107246150A, machine translation to English, Oct. 13, 2017 (Year: 2017).*

* cited by examiner

METHOD FOR 3D PRINTING PREFABRICATED MODULAR BUILDINGS

CROSS-REFERENCE TO RELATED APPLICATIONS

This application claims the priority to Chinese patent application CN201910281602.1 entitled "Method for 3D printing prefabricated modular buildings" filed on Apr. 9, 2019, the entirety of which is incorporated herein by reference.

FIELD OF THE INVENTION

The present disclosure relates to the field of construction technologies, and in particular to a method for 3D printing prefabricated modular buildings.

BACKGROUND OF THE INVENTION

The development of 3D printing in the construction industry is getting faster and faster. 3D printing can be used to construct concrete buildings. Compared with traditional construction techniques, 3D printing has significant advantages in reducing construction pollution and labor intensity. The current 3D printing method generally involves first printing the bottom (i.e., the base, the foundation) of the building, then forming walls on the bottom, and finally forming the top (i.e., the roof) on the walls. In this way, it requires at least three printing procedures to form a building, which is a cumbersome printing process. Besides, for a building formed by such a method, its top, its walls, and its bottom are not in one piece because they are printed separately and then assembled, and consequently the entire building is not obviously advantageous in its stress bearing property and anti-seismic property.

SUMMARY OF THE INVENTION

The present disclosure provides a method for 3D printing a prefabricated modular building to alleviate the technical problems of the existing technologies in the cumbersome and complicated printing process as well as the insufficient stress bearing property and anti-seismic property of buildings formed.

The method for 3D printing a prefabricated modular building of the present disclosure includes the following steps.

In step S10, concrete printing is performed using a 3D printing device to obtain an intermediate module and connection modules.

In step S20: the intermediate module is rotated by 90 degrees to obtain a fabricated module.

In step S30, the prefabricated module and the connection modules are assembled together to form a prefabricated building.

In one embodiment, step S10 includes the following sub-steps.

In step S11, a shape of the building is constructed using a support.

In step S12, four faces of the intermediate module are uninterruptedly formed by laying concrete layer by layer on the support using the 3D printing device.

In step S13, stress bearing members are constructed on two opposite faces of the intermediate module to complete construction of the intermediate module.

In step S14: at least two connection modules are formed using the 3D printing device.

In one embodiment, the four faces of the intermediate module formed in step S12 are a top, a bottom, a first wall, and a second wall of the building, respectively.

In one embodiment, the two connection modules formed in step S14 are a third wall and a fourth wall of the building, respectively.

In one embodiment, the support in step S11 is steel bars.

In one embodiment, the stress bearing members in step S13 are lifting hooks.

In one embodiment, the intermediate module formed in step S12 has a sewage recycling and treating system.

In one embodiment, step S20 includes the following sub-steps.

In step S21, lifting devices are respectively connected to the stress bearing members formed in step S13.

In step S22, the lifting devices are moved such that the intermediate module is rotated 90 by degrees in a vertical plane to obtain the prefabricated module.

In one embodiment, in step S21, different lifting devices are respectively connected to stress bearing members that are not in a same height plane.

In one embodiment, step S30 includes the following sub-steps.

In step S31, the prefabricated module and the connection modules each are transported to a construction site after an assembly test is performed on the prefabricated module and the connection modules in a factory.

In step S32, the prefabricated module and the connection modules are reassembled on the construction site to form the prefabricated building.

Compared with the existing technologies, the method for 3D printing a prefabricated modular building of the present disclosure has the following advantages.

(1) The prefabricated module of the building formed in the present disclosure is obtained by rotating the intermediate module by 90 degrees. After the intermediate module is rotated, the two originally vertical walls become horizontal walls, and the other two walls become supporting walls. This enables the building to be able to receive stresses as a whole, so that the formed building can be more stable and able to withstand the impact of natural disasters such as earthquakes.

(2) In the existing technologies, during forming of a building, the top, the bottom, and the walls can only be formed separately, which thus requires at least three printing procedures. In the present disclosure, however, the intermediate module is rotated by 90 degrees so that the four faces thereof become the top, the bottom, the first wall, and the second wall of the building, by way of which the top, the bottom, and the walls of the building is printed at one time, and a lot of working procedures and labor are thus saved.

The above technical features can be combined in various suitable ways or replaced by equivalent technical features, as long as the objective of the present disclosure can be achieved.

BRIEF DESCRIPTION OF THE DRAWINGS

The present disclosure will be described in more detail below based on non-limiting embodiments and with reference to the accompanying drawings. In the drawings.

In the drawings, the same components are denoted by the same reference numerals. The drawings are not drawn to actual scale.

Figure 1:
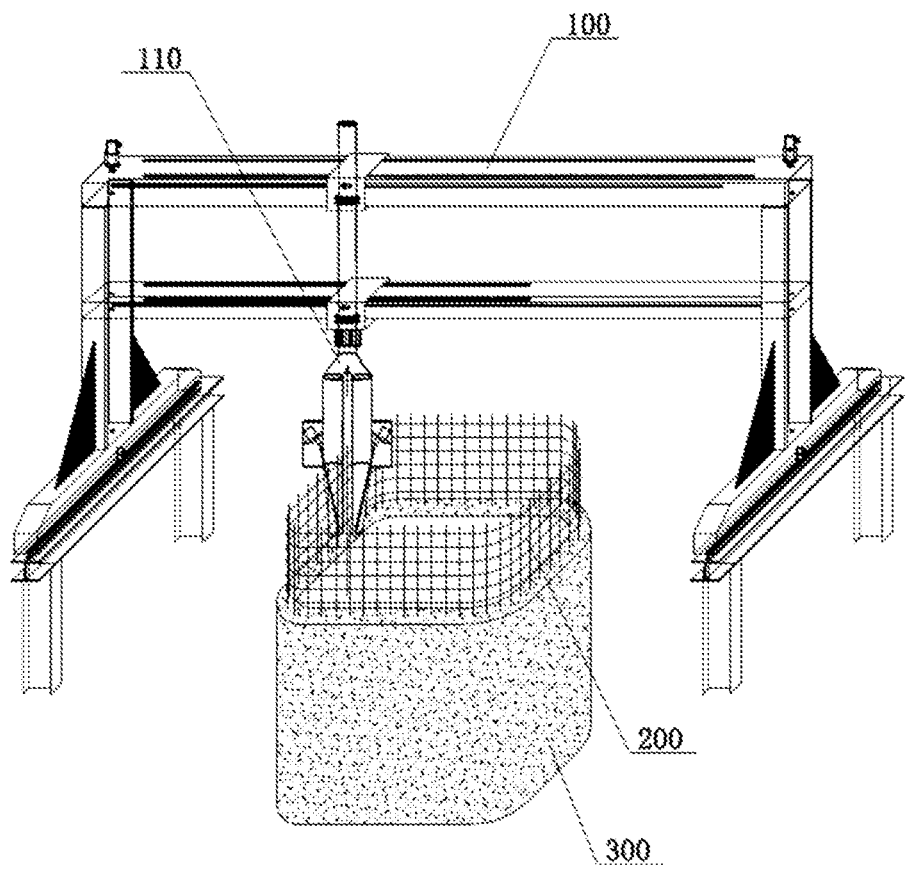
FIG. 1 is a schematic diagram of a process of forming an intermediate module in an embodiment of the present disclosure.

Meanings of the reference signs in the drawings are as follows.

100—3D printing device; 110—concrete discharge assembly; 111a, 111b—discharge port; 112a, 112b—discharge pipe; 113—vibrator;

1—truss body; 2—travelling mechanism; 3—driving mechanism; 5—adjusting device; 6—gear;

200—support; 210—arc steel bar; 220—steel bars;

300—intermediate module; 310a, 310b, 310c, 310d—stress bearing member;

400—prefabricated module; 500a, 500b—lifting device.

DETAILED DESCRIPTION OF THE EMBODIMENTS

The present disclosure will be further described in detail below with reference to the drawings of the specification and specific embodiments. It should be noted that, as long as there is no conflict, all the embodiments in the present disclosure and all the features in each of the embodiments can be combined with one another, and the technical solutions formed therefrom are all within the protection scope of the present disclosure.

As shown in FIGS. 1-9, the inventive concept of the method for 3D printing a prefabricated modular building of the present disclosure is as follows. First, a building module is formed using a 3D printing device in a factory. The building module printed by the 3D printing device is not for direct use. Instead, the building module is rotated by 90 degrees to form a prefabricated module before being put into use. By rotating the printed module, two originally vertical faces thereof become respective horizontal faces, forming a top and a bottom of the building, and two faces between these two faces become walls. This is advantageous in that it renders many procedures unnecessary because the rotation of the module enables the top, the bottom, and the walls to be formed at one time, and in that it greatly improves the stress bearing property and the anti-seismic property of the building because the top, the bottom, and the walls formed in this way are in one piece. Second, the formation of the intermediate module and formation of the prefabricated module as described above are all carried out in the factory; and works such as prefabrication and testing are all completed in the factory, and then these prefabricated modules are transported to a site for assembly. This meets the requirements for energy conservation and environmental protection, and can also help to save a lot of manpower, material resources, and time on site. Besides, dismantlement of the building formed by the method of the present disclosure is an inverse process of assembling of the building. After being dismantled, each module is transported back to the factory for environmentally friendly dismantling and reuse. There is hence no construction waste on site. Compared with the existing construction methods, the method of the present disclosure realizes incomparable energy saving and environmental protecting properties.

In a specific embodiment, the method of the present disclosure includes the following steps.

In a first step, concrete printing is performed using a 3D printing device 100 to obtain an intermediate module 300 and connection modules.

Specifically, first, a shape of the building is formed using a support 200. A drawing of the building that needs to be printed is designed according to a demand drawing of the building (such as the building). Note here that the building to be printed is a building structure that has been rotated by 90 degrees in advance. In other words, at the beginning of the design, the practically desired building is rotated, and then the rotated building is used as the shape of the building to be printed; and when the printing is completed, the printed building is rotated in an opposite direction to obtain a building that is exactly the same as the practically desired building.

Further, it is necessary to leave space for or embed accessories such as drainage, water supply, or wires in advance in the building to be printed. Then, printing is performed using the 3D printing device 100 shown in FIG. 1.

Figure 2:
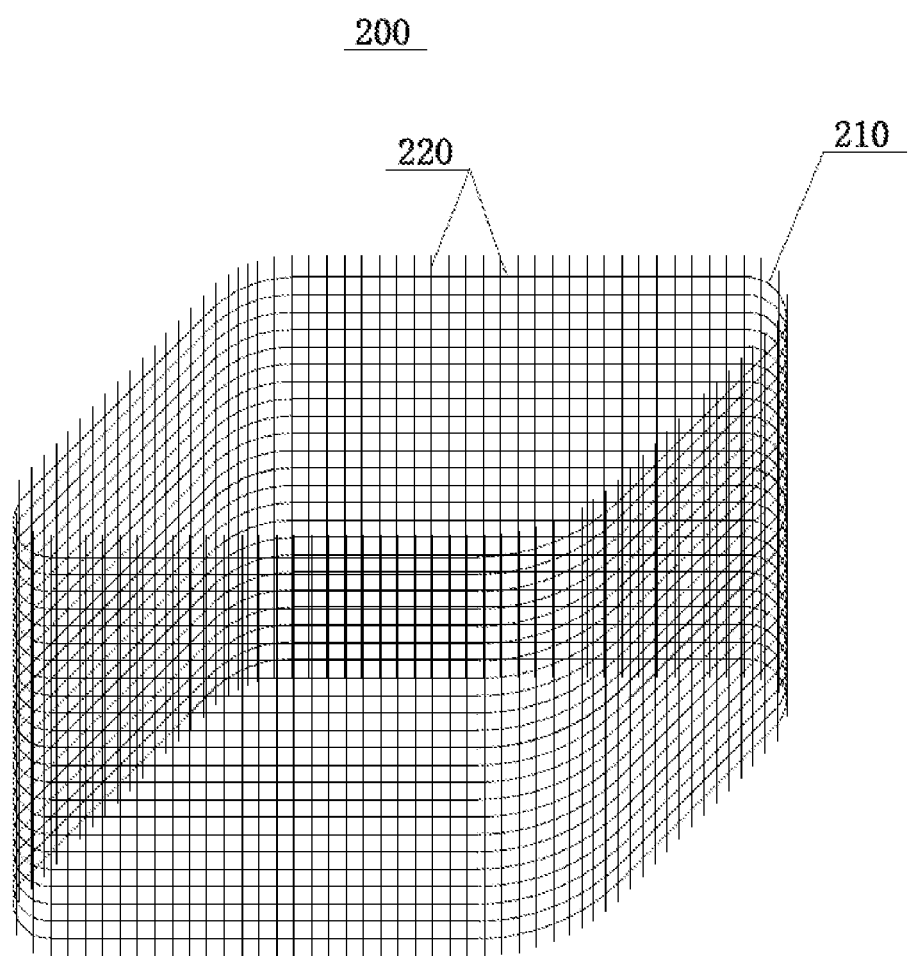
FIG. 2 is a schematic diagram of a structure of a support shown in FIG. 1.

When printing is performed, as shown in FIG. 2, the support 200 is arranged and bound along a travelling trajectory of a concrete discharge assembly 110 of the 3D printing device 100. The support 200 may be steel bars 220.

After the binding is completed, it is checked whether a geometric size of the bound steel bars 220 is consistent with a size as indicated in the pre-designed drawing of the building to be printed. In particular, it is checked whether an angle of an arc steel bar 210 at a corner of the building is the same as an angle as indicated in the drawing of the building to be printed, so as to ensure a correct shape of the building.

When the shape of the building is formed using the support 200, because the final intermediate module 300 needs to be rotated by 90 degrees, it is necessary to consider interchanging horizontal steel bars and vertical steel bars in the practically desired building, so that after the printed building is rotated, directions of the steel bars are exactly the same as required directions for the steel bars in the practically desired building to ensure that the steel bars in the building can receive stresses properly.

Then, concrete is laid layer by layer on the support 200 using the 3D printing device 100 to uninterruptedly form four faces of the intermediate module 300.

First, the 3D printing device 100 used in the present disclosure will be described.

Figure 10:
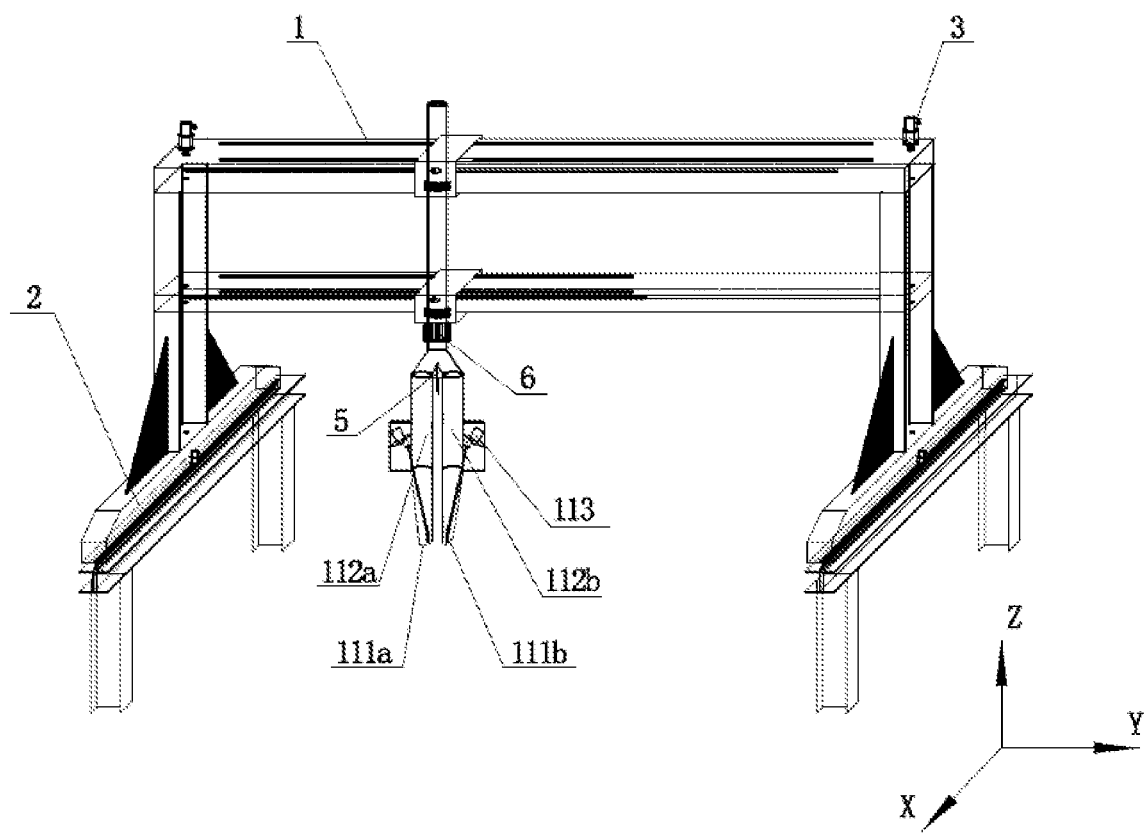
FIG. 10 is a schematic diagram of a three-dimensional structure of a 3D printing device in an embodiment of the present disclosure.

As shown in FIG. 10, the 3D printing device 100 of the present disclosure includes a truss body 1, driving mechanisms 3 respectively provided on the truss body 1, a traveling mechanism 2 connected to the driving mechanisms 3, and the concrete discharge assembly 110 provided on the traveling mechanism 2. When in use, the travelling mechanism 2 drives the concrete discharge assembly 110 to travel along a preset trajectory. During the travelling, the concrete discharge assembly 110 discharges concrete to complete construction of the building. Before the concrete printing is performed using a 3D building printer, the steel bars 220 may be arranged on the travelling trajectory of the concrete discharge assembly 110 as a wall skeleton, and walls of the building are built by means of the concrete and the steel bars 220 to improve strength and stress bearing properties of the building. The use of the 3D building printer facilitates automatic printing of the building and improves degree of automation during construction of the building.

Further, the concrete discharge assembly 110 includes discharge pipes 112a, 112b provided with discharge ports 111a, 111b respectively, as well as vibrators 113 for vibrating the concrete in the respective ones of the discharge pipes 112a, 112b. The discharge pipes 112 each are not provided with a gate for blocking the concrete, but the discharge ports each have a diameter that is set to a certain small range. When the concrete is placed in the discharge pipes 112a, 112b, the concrete does not fall automatically as it is limited by the discharging ports and vibrating rods of the vibrators 113. When it is necessary to discharge the concrete from the discharge pipes 112a, 112b, the vibrators 113 are activated, and the concrete is vibrated by the vibrators 113 so that the concrete is discharged from the discharge ports under the vibration of the vibrators 113. In this case, components of the concrete may include sand, stones, cement, and water, and viscosity of the concrete may be the same as that of concrete used in actual construction of the building. When the concrete with such a viscosity is placed in the discharge pipes 112a, 112b, the concrete can only flow out from the discharge ports under the vibration of the vibrators 113. The above configuration can reduce occurrences of uneven concrete discharge; and the structure is simple, conducive to automated control, convenient to use, and can help to save effort.

Upper parts of respective ones of the discharge pipes 112a, 112b each may be configured in a straight cylindrical shape, and lower parts thereof each may be configured in a tapered cylindrical shape. Fixing of the discharge pipes 112a, 112b is realized by fixing a pipeline on the truss body 1. Top ends of respectively ones of the two discharge pipes 112a, 112b may be fixed on the traveling mechanism 2 by means of, for example, an adjusting device 5, so that a distance between the two discharge pipes 112a, 112b can be adjusted by means of the adjusting device 5. The discharge pipes 112a, 112b are provided at respective bottoms thereof with the discharge ports 111a, 111b respectively, and the discharge pipes 112a, 112b each are provided therein with a vibrator 113. The above configuration can help to reduce interference between the vibrators 113, improve uniformity of concrete discharge, and thus improve flatness of the walls of the building; and the structure is simple and easy to realize.

When the traveling mechanism 2 travels along a first direction X, the two discharge ports are arranged side by side along a second direction Y perpendicular to the first direction X. When the traveling mechanism 2 travels along the second direction Y, the two discharge ports 111a, 111b are arranged side by side along the first direction X perpendicular to the second direction Y. When in use, the two discharge ports 111a, 111b are located on two sides of the steel bars 220 respectively, so that the steel bars 220 can be wrapped by the concrete to prevent the concrete and the steel bars 220 from being separated from each other.

In addition, the 3D printing device 100 of the present disclosure may print a building with a rounded corner. Specifically, formation of the rounded corner is as follows. Because the two discharge ports 111a, 111b are located on two sides of the steel bars 220 respectively, the concrete discharged from the discharge ports 111a, 111b on the two sides wraps the steel bars 220 located at a middle position between the discharge ports 111a, 111b to form a thickness of a wall. Since the wall printed each time has a thickness (which is the distance between the two discharge ports 111a, 111b) and a height (which is the height of each layer), when the wall is cut by a plane perpendicular to the ground, a rectangular cross section formed from the discharged concrete can be obtained. In other words, each time the printing is performed, the discharged concrete is a body with a rectangular cross section. In order to ensure that the rectangular cross section is well formed from the discharged concrete when printing is performed along an arc-shaped trajectory, and ensure that the steel bars 220 on the arc-shaped trajectory are always located at the middle position between the two discharge ports 111a, 111b, it is necessary to adjust an angle of a discharge direction of each of the discharge ports 111a, 111b through a gear 6 while adjusting a travelling rate in each of two directions along a horizontal axis (X) and a vertical axis (Y) of the building during printing of an arc-shaped wall, so that the discharge directions of the discharge ports 111a, 111b are always kept consistent with the angle of the arc-shaped trajectory of the steel bars 220. The two discharge ports 111a, 111b are always located on two sides of the steel bars 220 on the arc-shaped trajectory in a symmetrical manner. This realizes printing of a continuous and smooth arc-shaped wall during transition from the horizontal axis X of the building coordinates to the vertical axis Y of the building coordinates, without interruptions during the printing.

Therefore, in the present disclosure, the rounded corner is formed under combined effects of two technical features, namely the two discharge ports 111a, 111b and the discharge pipes 112a, 112b are connected to the pipeline via the gear 6 so as to be able to rotate.

The designed drawing for the building to be printed is input into a computer control system, and a zero point is set. The zero point is calculated and designed based on a reference point of the building and is also a starting point for the printing. Before the printing, the printer is enabled to conduct a test run along a contour of the steel bars 220 at a speed of less than 1 m/min; and meanwhile it is checked whether the geometric size of the steel bars 220 is consistent with that as indicated in the drawing, and verticality of the steel bars 220 is checked again. If no problem is found in the checking, a zero point of the discharge ports 111a, 111b of the printer is aligned with a zero point on a contour of the building. The steel bars 220 are arranged at the middle position between the two discharge ports 111a, 111b, and the discharge pipes 112a, 112b on the sides are filled with concrete. Under the action of the vibrators 113 in the pipes, the concrete flows out from the discharge ports to thereby form at one time a concrete wall with steel bars 220 through the printing.

A terminal control system instructs, according to data on preset graphics, servo motors at various positions of the printer to run to ensure that the printer runs according to the preset graphics. A formation state of slurry at each of the discharge ports of the printer is observed, and an operating speed of the printer is adjusted at any time to ensure appearance and density of a wall printed. When one lap of the printing is completed, a slice (a layer) of the building to be printed is formed. After the printing of a slice is completed, the printer automatically returns to the zero point and automatically lifts the discharge pipes 112 to a required height. After repeated operations in a similar fashion, the 3D printing of the intermediate module 300 is completed.

Figure 3:
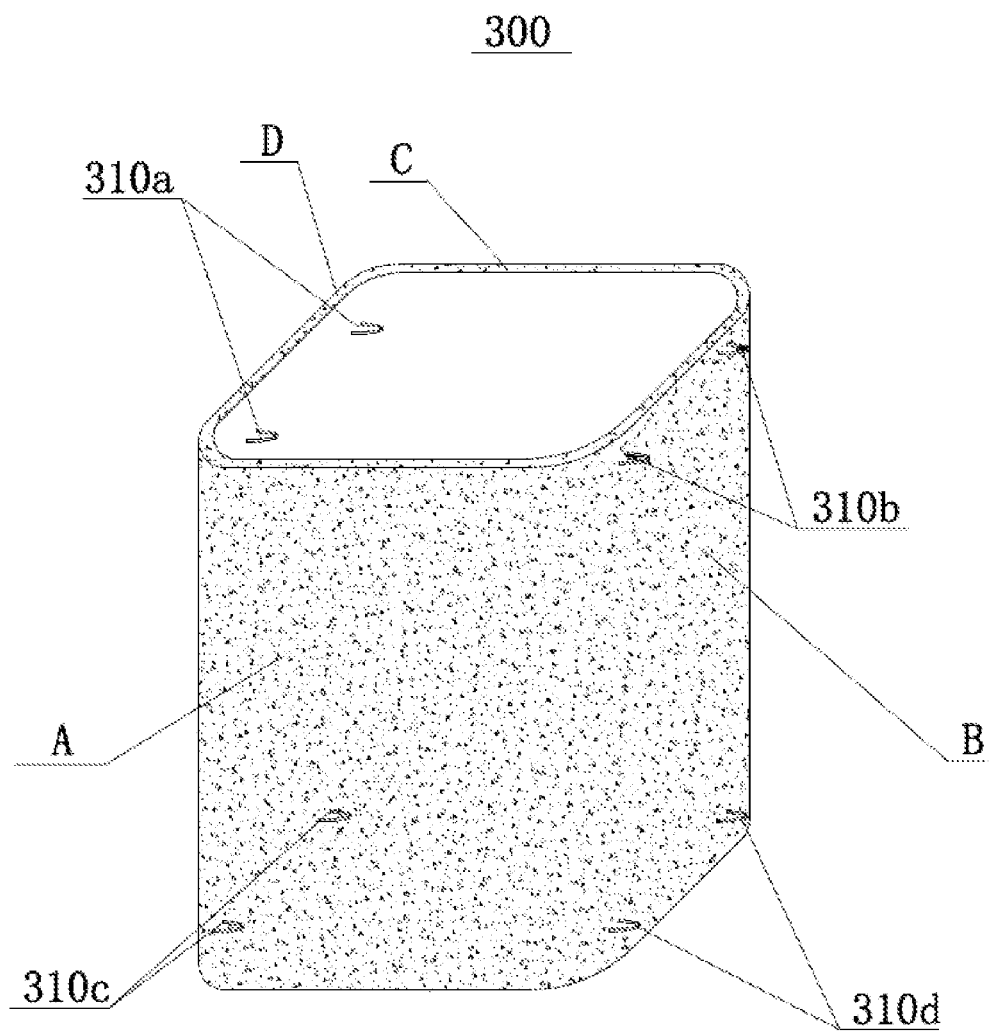
FIG. 3 is a schematic diagram of a structure of the intermediate module shown in FIG. 1.

As shown in FIG. 3, the intermediate module 300 formed from the printing has four consecutive faces, namely A, B, C, and D as shown in FIG. 3. Further, the four faces of the intermediate module formed in step S12 are a top, a bottom, a first wall, and a second wall of the building, respectively. In other words, because the intermediate module 300 has a building shape that is obtained from the printing based on the practically desired building that has been rotated in advance, the face D and the face B of the intermediate module 300 shown in FIG. 3 are the top and the bottom of the practically desired building, and the face A and the face C are the first wall and the second wall of the practically desired building.

Figure 6:
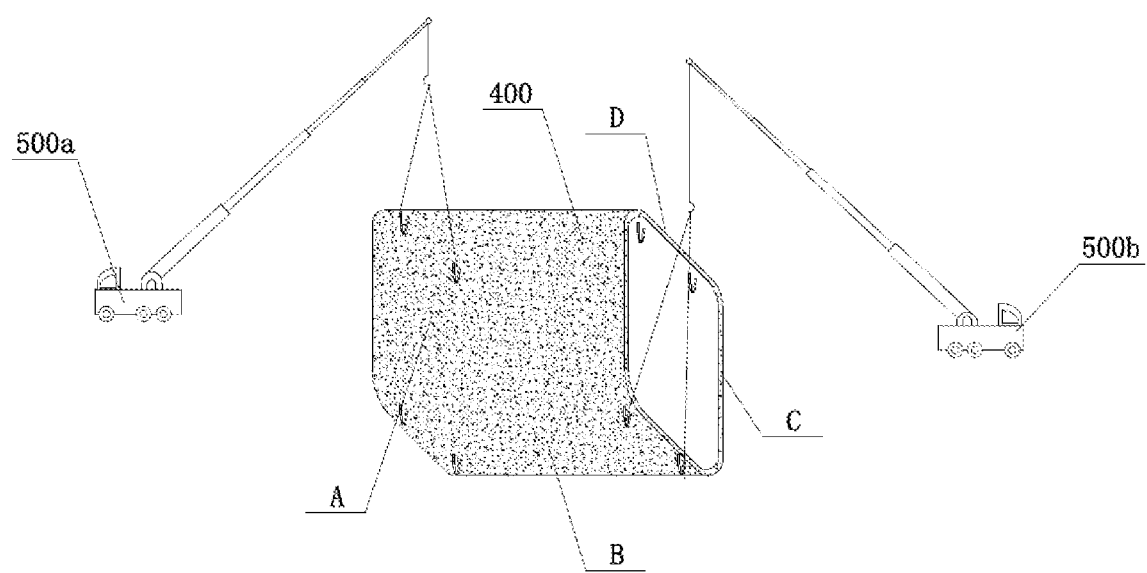
FIG. 6 is a schematic diagram of the intermediate module rotated by 90 degrees in the embodiment of the present disclosure.

As can be seen from FIG. 3, the four faces of the printed intermediate module 300 are in one piece, and transition between the four faces is arc transition. In the existing technologies, printing based on a drawing can also form a building shape as shown in FIG. 3, but since the building formed by printing in the existing technologies is directly put into use, the four faces of the building are individually stressed. In the present disclosure, however, after the intermediate module 300 shown in FIG. 3 is formed, the intermediate module 300 is not directly put into use, but is rotated by 90 degrees to form a prefabricated module 400 before it is put into use. The prefabricated module 400 is shown in FIG. 6, the original face D and face B in the intermediate module 300 become the top and the bottom respectively, and these two faces are in one piece with the face C and the face A. The building formed by the intermediate module hence receives stresses as a whole, and thus has a stronger stress bearing property. Further, because the transition between the four faces is arc transition, the stresses can be evenly transmitted through the arc, which entitles the building formed therefrom a better anti-seismic property.

Furthermore, since the intermediate module 300 needs to be rotated, when the intermediate module 300 is constructed, it is necessary to construct stress bearing members 310a, 310b, 310c, and 310d on two opposite faces (such as the face B and the face D) of the intermediate module 300 to thereby complete the construction of the intermediate module 300.

In the embodiment shown in FIG. 3, the face B is provided at different heights thereof with the stress bearing members 310b and 310d respectively, and two stress bearing members are provided at the same height. Similarly, the face D is provided with stress bearing members 310a and 310c.

Further, the above stress bearing members 310a, 310b, 310c, and 310d are lifting hooks. The stress bearing members may be formed by leaving a space or embedding through reasonable calculations during formation of the intermediate module 300.

It should be noted that in the above formed intermediate module 300, openings have been left for necessary components such as doors and windows. It is thus only necessary to assemble the above-mentioned necessary components on site.

Finally, at least two connection modules are formed by using the 3D printing device. The two connection modules are a third wall and a fourth wall of the building respectively. The way of constructing the connection modules is the same as that constructing the intermediate module 300, and thus will not be repeated herein.

In one embodiment, the intermediate module 300 formed by printing has a sewage recycling and treating system. The sewage recycling and treating system may be arranged in the intermediate module 300, and a small sewage recycling and treating system may be formed by 3D printing, to solve many construction problems in traditional buildings.

In a second step, the intermediate module 300 is rotated by 90 degrees to obtain the prefabricated module 400.

Specifically, first, lifting devices 500a and 500b are respectively connected to the stress bearing members formed in the above described steps. When connecting, the two lifting devices 500a, 500b are respectively connected to the stress bearing members on the two opposite faces of the intermediate module 300, and are respectively connected to two stress bearing members on the two faces that are not in a same height plane.

Figure 4:
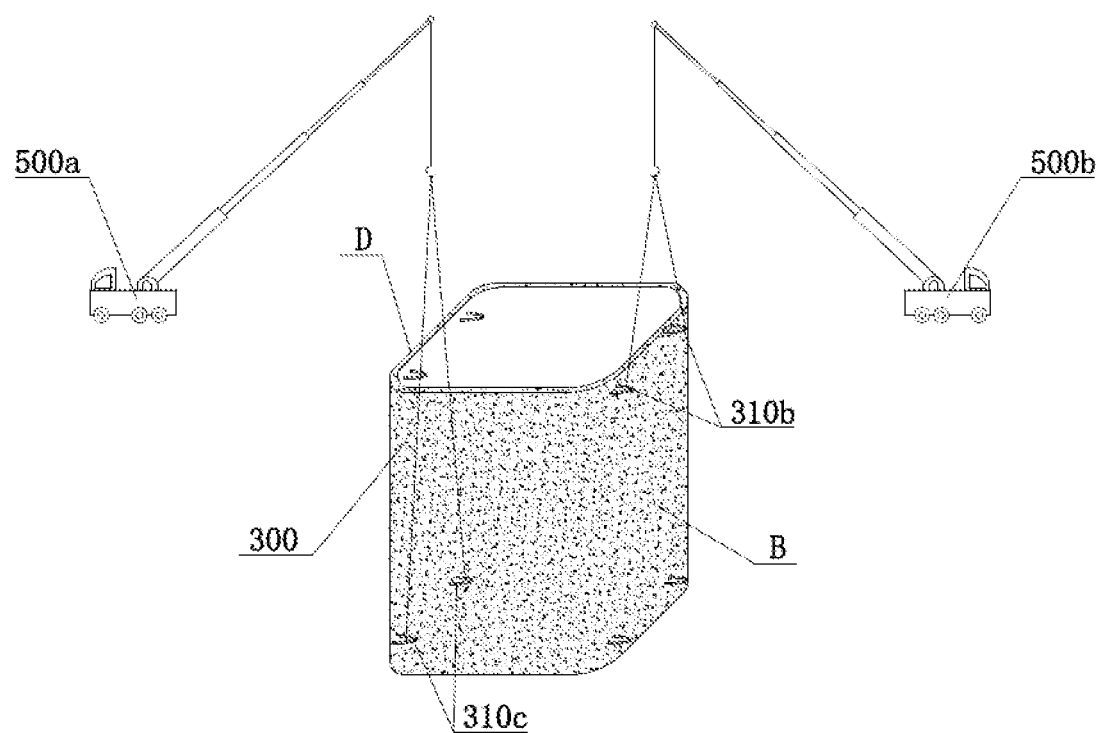
FIG. 4 is a schematic diagram of a process of rotating the intermediate module in the embodiment of the present disclosure.

In the embodiment shown in FIG. 4, the lifting device 500a is connected to the stress bearing member 310c on the face D of the intermediate module 300, and the lifting device 500b is connected to the stress bearing member 310b on the face B of the intermediate module 300, to ensure that the intermediate module 300 is evenly stressed.

Figure 5:
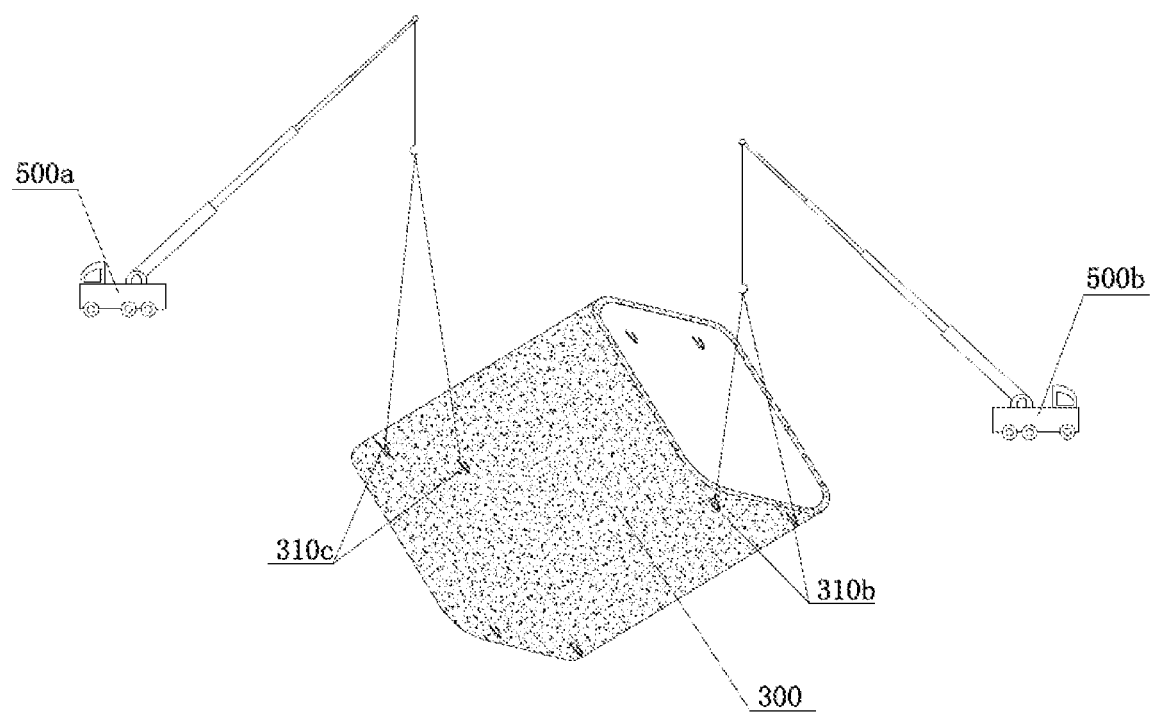
FIG. 5 is a schematic diagram of the intermediate module rotated by 45 degrees in the embodiment of the present disclosure.

Then, as shown in FIGS. 5 and 6, the lifting devices 500 are moved to rotate the intermediate module 300 by 90 degrees in a vertical plane to obtain the prefabricated module 400.

When lifting of the intermediate module 300 starts, the lifting devices 500a, 500b simultaneously lift the intermediate module 300. When the intermediate module 300 reaches a certain height, the lifting device 500a continues to ascend, and the lifting device 500b slowly descends, so that the intermediate module 300 starts to tilt until the intermediate module 300 is completed rotated by 90 degrees to obtain the prefabricated module 400.

In a third step, the prefabricated module 400 and the connection modules are assembled together to form a prefabricated building.

Specifically, first, after assembly test is performed on the prefabricated module 400 and the connection modules in the factory, the prefabricated module 400 and the connection modules each are transported to the construction site. Then, the prefabricated module 400 and the connection modules (not shown) are reassembled on the construction site to form a prefabricated building.

It should be noted that the above-mentioned connection component may be connected on an outermost side of the prefabricated module 400, or connected between two prefabricated modules 400, and may be assembled as required.

Figure 7:
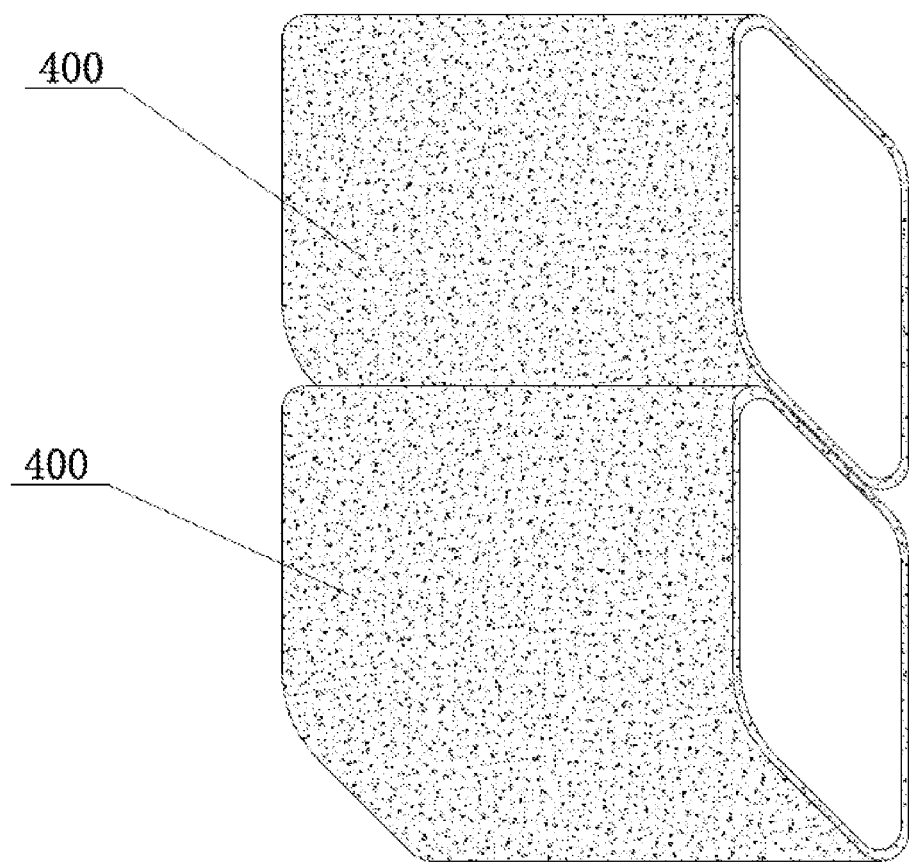
FIG. 7 is a schematic diagram of assembling prefabricated modules in an embodiment of the present disclosure.
Figure 8:
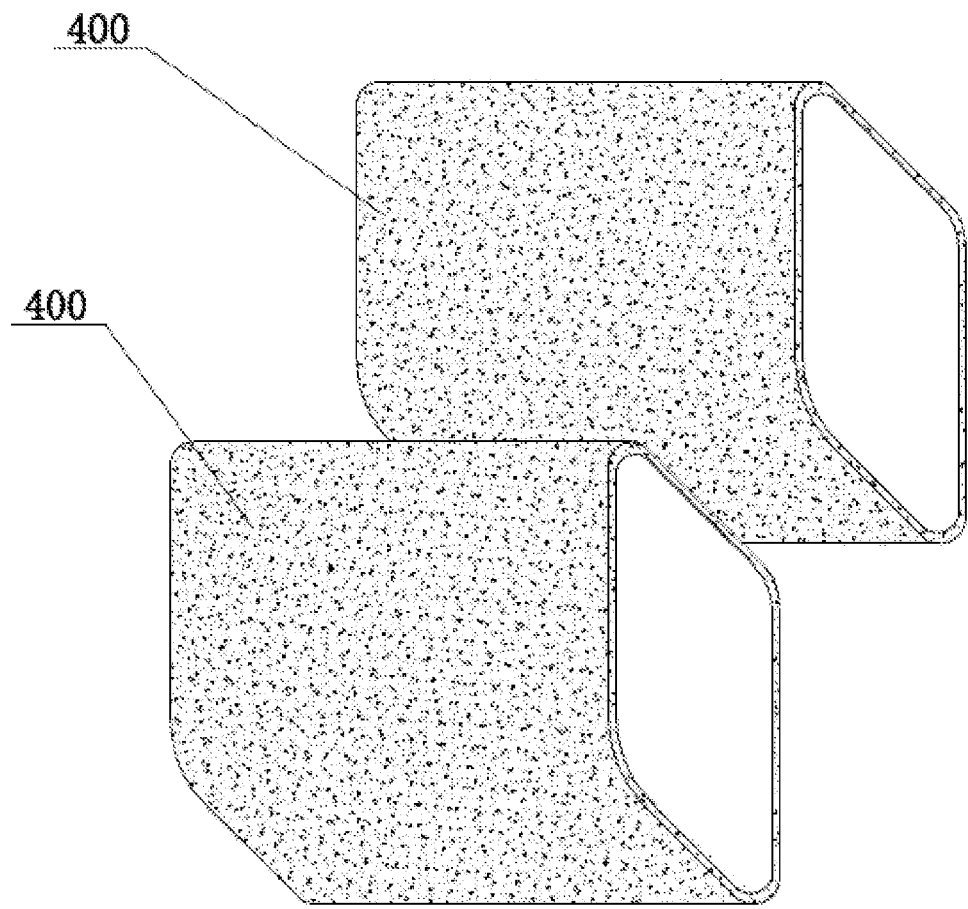
FIG. 8 is a schematic diagram of assembling prefabricated modules in another embodiment of the present disclosure.
Figure 9:
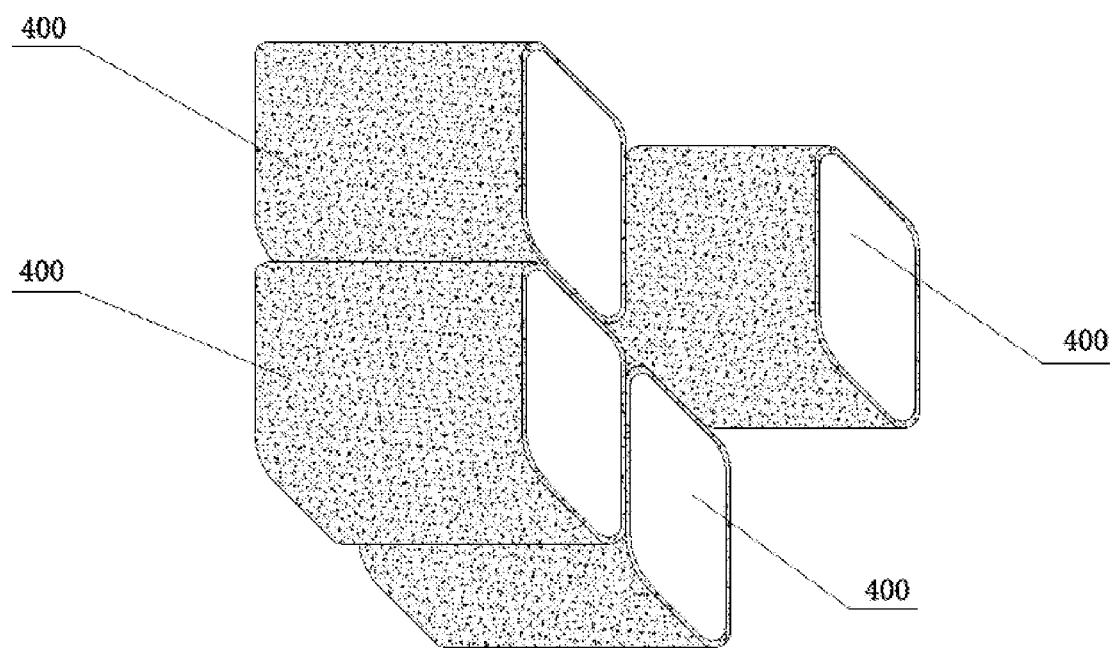
FIG. 9 is a schematic diagram of assembling prefabricated modules in further another embodiment of the present disclosure.

As shown in FIGS. 7 to 9, different prefabricated modules 400 may be assembled as required in different ways. As shown in FIG. 7, two prefabricated modules 400 are stacked in an aligned manner to form a two-story building. As shown in FIG. 8, two prefabricated modules 400 are stacked in a mutually staggered manner to form a two-story building, which can obtain a larger space. As shown in FIG. 9, fabricated modules 400 on each floor are combined in pairs, and the fabricated modules 400 on an upper floor and the fabricated modules 400 on a lower floor are aligned or staggered with each other, where a space formed at a staggered position may be a building structure such as a corridor, an aisle, etc. Such staggering of the prefabricated modules 400 can be helpful in saving cost for a user while making the best of the space.

That is to say, the work of forming both the intermediate module 300 and the prefabricated module 400 in the above steps is carried out in the factory, and a series of work such as prefabrication and testing are also completed in the factory. In this way, industrial flow line production can be formed, thus laying a foundation for prefabricated and functional modular production in future construction industry. Transporting these prefabricated modules to the site for assembly meets the requirements for energy conservation and environmental protection, and can also help to save a lot of manpower, material resources, and time on site. Besides, dismantlement of the building formed by the method of the present disclosure is an inverse process of assembling of the building. After being dismantled, each module is transported back to the factory for environmentally friendly dismantling and reuse. There is hence no construction waste on site. Compared with the existing construction methods, the method of the present disclosure realizes incomparable energy saving and environmental protecting properties.

In summary, according to the method for 3D printing a prefabricated modular building of the present disclosure, because the printed module is rotated 90 degrees before being put into use, use functions and use effects of the printed module are changed, and further the way the entire building receives stresses and the functions of the building are also changed, which improves the strength of the building. In addition, during printing, the bottom (the base), the walls, and the roof can be printed at one time. This method can be used in bridge construction, landscaping, water buildings, island construction, and many other fields to give play to its advantages.

Although the present disclosure has been described with reference to the preferred embodiments, various modifications can be made thereto and the components therein can be replaced with equivalents without departing from the scope of the present disclosure. In particular, as long as there is no conflict, various technical features described in the various embodiments can be combined in any manner. The present disclosure is not limited to the specific embodiments disclosed herein, but includes all technical solutions falling within the scope of the claims.

The invention claimed is:

1. A method for 3D printing a prefabricated modular building, comprising the following steps:
   step S10: performing concrete printing using a 3D printing device to obtain an intermediate module and connection modules;
   step S20: rotating the intermediate module by 90 degrees in a vertical plane to obtain a prefabricated module; and
   step S30: assembling the prefabricated module and the connection modules together to form the prefabricated modular building,
   wherein step S10 comprises the following sub-steps:
   step S11: constructing a shape of the intermediate module using a support; wherein the support is steel bars, and interchanging horizontal steel bars and vertical steel bars in a practically desired building, so that after the intermediate module is rotated, directions of the steel bars are exactly the same as required directions for the steel bars in the practically desired building to ensure that the steel bars in the intermediate module can receive stresses properly;
   step S12: forming four faces of the intermediate module uninterruptedly by laying concrete layer by layer on the support using the 3D printing device;
   wherein the four faces of the intermediate module formed in step S12 are a top, a bottom, a first wall, and a second wall of the intermediate module, respectively, and the top, the bottom, the first wall and the second wall are connected with each other to form a ring structure;
   wherein the top, the bottom, the first wall, and the second wall are solid structure walls with thickness respectively;
   step S13: constructing stress bearing members on two opposite faces of the intermediate module to complete construction of the intermediate module; and
   step S14: forming at least two connection modules using the 3D printing device,
   wherein transitions between the top, the bottom, the first wall, and the second wall are arc transitions,
   wherein the 3D printing device adjusts an angle of a discharge direction of each of two discharge ports through a gear while adjusting a travelling rate in each of two directions along a horizontal axis (X) and a vertical axis (Y) of the intermediate module during printing of arc-shaped walls, so that the discharge directions of the discharge ports are always kept consistent with an angle of an arc-shaped trajectory of the steel bars, which realizes printing of a continuous and smooth arc-shaped wall during transition from horizontal axis (X) building coordinates to vertical axis (Y) building coordinates; and
   wherein the concrete discharged from the discharge ports on two sides of the steel bars wraps the steel bars located at a middle position between the discharge ports to form a thickness of the wall, and the wall printed each layer has a height which is the height of each layer.

2. The method for 3D printing a prefabricated modular building according to claim 1, wherein the two connection modules formed in step S14 are a third wall and a fourth wall of the prefabricated modular building, respectively.

3. The method for 3D printing a prefabricated modular building according to claim 1, wherein the stress bearing members in step S13 are lifting hooks.

4. The method for 3D printing a prefabricated modular building according to claim 1, wherein the intermediate module formed in step S12 has a sewage recycling and treating system.

5. The method for 3D printing a prefabricated modular building according to claim 1, wherein step S20 comprises the following sub-steps:
   step S21: connecting lifting devices respectively to the stress bearing members formed in step S13; and
   step S22: moving the lifting devices, such that the intermediate module is rotated by 90 degrees in a vertical plane to obtain the prefabricated module.

6. The method for 3D printing a prefabricated modular building according to claim 5, wherein in step S21, different lifting devices are respectively connected to stress bearing members that are not in a same height plane.

7. The method for 3D printing a prefabricated modular building according to claim 1, wherein step S30 comprises the following sub-steps:
   step S31: transporting the prefabricated module and the connection modules each to a construction site after an assembly test is performed on the prefabricated module and the connection modules in a factory; and
   step S32: reassembling the prefabricated module and the connection modules on the construction site to form the prefabricated modular building.

* * * * *